Patented Jan. 11, 1944

2,339,033

UNITED STATES PATENT OFFICE 2,339,033

PLASTICIZING RUBBER

Robert L. Sibley, Nitro, W. Va., assignor to Monsanto Chemical Company, St. Louis, Mo., a corporation of Delaware No Drawing. Application August 4, 1941, Serial No. 405,371

20 Claims. (Cl. 260—761)

This invention relates to improvements in the treatment of rubber and more particularly to a method of increasing the plasticity of rubber and to the plasticized rubber compositions obtained thereby.

In the manufacture of rubber articles it is often desired to increase the plasticity of the rubber in order to facilitate the incorporation of compounding and vulcanizing ingredients as well as to provide a rubber composition which is amenable to shaping into the form of the finished article. For example a tubing operation is obviously expedited by use of a rubber composition which will flow under the application of but slight or moderate stress. While mechanical manipulation alone may be resorted to for the plasticization of rubber, this is a time consuming operation and results in a permanent break down of the rubber. The internal structure is disturbed so that the cured rubber products exhibit low tensile strengths and low elasticity. Accordingly it is common practice to add to the rubber, during the milling or equivalent operation, a material which assists in producing softness. However, under the high temperature, short time, milling technique now widely employed the initial benefit derived from the softener is relatively less important so that for practical purposes it is essential that the softening effect persist up to the time of vulcanization. This means, among other things, that the softener or plasticizer must be effective in the presence of the usual compounding and vulcanizing ingredients since most of these ingredients are added during the initial plasticization and the stock stored until the time for final processing. Obviously, little benefit would be derived from a softener if its effect disappeared before the stock was tubed or submitted to similar operation. Many compounds, which are effective softeners for rubber alone, are inactivated by other ingredients normally added thereto. However, the present invention provides a class of softening or plasticizing agents for rubber whose effect persists in the presence of compounding and vulcanizing ingredients.

It is an object of this invention to provide a class of materials which, when added to rubber, will materially increase its rate of plasticization during mastication. A further object of this invention is to achieve a saving of time and power consumed in ordinary mechanical plasticization of rubber. A still further object is to facilitate the production of vulcanized rubber articles. Other objects are to provide new compositions of matter and to provide a softened rubber of desirable physical properties and particularly to provide a softened rubber whose desirable properties persist up to the time of vulcanization. Still other objects will be apparent from the following description.

In accordance with this invention rubber is subjected to the action of a compound containing the nucleus

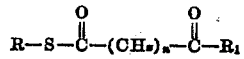

where R is an organic ester forming group in which carbon is linked to the sulfur atom, $x$ is an integer less than three, $n$ is zero or an integer and $R_1$ is an organic substituent. For example R may be an alkyl, aryl or aralkyl group such as phenyl, tolyl, xylyl, naphthyl, biphenyl, amyl phenyl, chlor phenyl, butyl, amyl, propyl, benzyl or other ester forming group. $R_1$ may likewise be an alkyl, aryl or aralkyl group as illustrated above or one of these groups linked through an intermediary such as sulfur or oxygen. In this connection an important class of compounds containing the nucleus set forth above are the thio esters of aliphatic dicarboxylic acids. By a "thio ester" is meant an ester in which an ester forming substituent is linked through sulfur to the carbonyl group of an aliphatic dicarboxylic acid. Both the mono thio esters and the dithio esters of aliphatic dicarboxylic acids possess useful plasticizing effects in rubber. Typical aliphatic dicarboxylic acids which form useful thio esters comprise oxalic acid, malonic acid, malic acid, succinic acid, glutaric acid, maleic acid, fumaric acid and equivalents and analogues thereof.

In the preferred aspects of the invention there is employed a thio ester of oxalic acid. Particularly efficacious results have been obtained with compounds of the structure

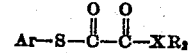

where Ar represents an aryl radical which may be substituted, X is oxygen or sulfur and $R_2$ is an ester forming group.

The compounds of this invention may be prepared by methods well known to the art. Thus, a thio ester of oxalic acid may be prepared by the reaction of an oxalyl chloride and a mercaptan. For example xylyl thio ethyl oxalate was prepared from ethyl chlor oxalate and xylyl mercaptan and butyl thio ethyl oxalate was prepared from ethyl chlor oxalate and butyl mercaptan, hydrogen chloride being split out as a by-product in each case. The symmetrical thio esters as for example diphenyl dithio oxalate M. P. 115-118°, may be prepared from oxalyl chloride and a mercaptan. The reactants may be mixed directly or better the reaction conducted in pyridine or similar solvent.

Mixed anhydrides coming within the purview of this invention may be prepared in similar manner substituting a thiolic or dithionic acid or salt thereof for the mercaptan. For example, potassium ethyl xanthate was reacted with ethyl chlor oxalate in substantially equimolecular proportions employing ethyl acetate as a solvent. The reaction mixture was kept at room temperature or below and after completion of the reaction the charge was filtered to remove KCl and the solvent removed by distillation under a mild vacuum. The yellow oil remaining was cooled to 10° to separate a small quantity of crystalline impurity formed in the reaction and the latter filtered off. The residue, believed to be the mixed thio anhydride of mono ethyl oxalate and ethyl monothion carbonic acid (ethyl xanthic acid) was found to possess useful softening properties in rubber as hereinafter shown.

Substantially equimolecular proportions of potassium thio benzoate and ethyl chlor oxalate were reacted in the manner described above employing benzene as a solvent. The product was an oil believed to be the mixed thio anhydride of mono ethyl oxalate and thio benzoic acid formed in accordance with the following equation:

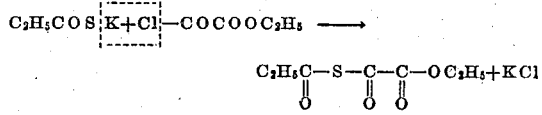

Its desirable softening properties are hereinafter shown.

Obviously, other methods of preparation and other means of carrying out the reactions described above may be employed there convenient or desirable. This invention is not concerned with the preparation of the compounds and is in nowise limited thereto.

The new softening agents are advantageously incorporated into the rubber as early as possible in the milling operation and the milling continued either with or without the addition of other ingredients until the desired degree of plasticity is attained. In general from 0.05% to 1.0% on the rubber are adequate for most purposes but other proportions may be employed where desired. Neither sulfur, at least up to 3% on the rubber, nor zinc oxide have any deleterious action on the softening properties. Of course if the rubber is in vulcanizable condition care must be taken to keep it below curing temperature.

The following specific embodiments of the invention illustrate the desirable properties of the new softening or plasticizing agents but are not to be taken as limitative of the invention.

A quantity of a rubber-carbon black master batch composed of sixty parts smoked sheets of rubber and forty parts of carbon black was milled for a short time to assure uniformity and then smoked sheets of rubber, compounding and vulcanizing ingredients (except sulfur) were added in such amount as to produce rubber stocks of the compositions shown below. In order to assure reproducible results the same temperature and time of milling was employed in the preparation of each stock. Thus, the total milling time was nine minutes and the mill rolls were maintained at a temperature of 100° C. In this manner rubber base stocks were compounded comprising,

|  | Base stock | |
| --- | --- | --- |
|  | #1 | #2 |
|  | Parts by weight | Parts by weight |
| Smoked sheets of rubber | 100 | 100 |
| Carbon black | 50 | 50 |
| Zinc oxide | 5 | 5 |
| Laurex | 2 | 2 |
| Condensation product p-amino diphenyl-acetone | 1.5 | 1.5 |
| Mercaptobenzothiazole | 0.75 | 0.75 |
| Sulfur |  | 3 |

In similar manner rubber stocks comprising these base stocks plus the ingredients shown below were prepared. The parts are by weight.

| Stock | Base stock number | Ingredient added to base stock | Parts by weight |
| --- | --- | --- | --- |
| A | 1 | Diphenyl dithio oxalate | 0.15 |
| B | 2 | do | 0.15 |
| C | 1 | Xylyl thio ethyl oxalate | 0.15 |
| D | 1 | do | 0.25 |
| E | 2 | do | 0.25 |
| F | 1 | Dixylyl dithio oxalate | 0.15 |
| G | 1 | Diphenyl dithio fumarate | 0.25 |
| H | 1 | Dixylyl dithio maleate | 0.25 |
| J | 1 | Butyl thio ethyl oxalate | 0.15 |
| K | 1 | Dixylyl dithio malonate | 0.25 |
| L | 1 | Mixed thio anhydride of ethyl mono thion carbonic acid and mono ethyl oxalate | 0.25 |
| M | 1 | Mixed thio anhydride of thiol benzoic acid and mono ethyl oxalate | 0.15 |

At the end of the milling period the stocks so compounded were sheeted out and allowed to cool to room temperature. The sheets were then folded back upon themselves to build up a thickness sufficient to permit the cutting out of test pellets and test pellets were then cut out by means of a suitable die. The plasticity was determined by means of an extrusion plastometer. A description of the method and apparatus is given by J. H. Dillon in Rubber Chemistry and Technology volume 9, (1936) pages 496–501. The stocks were usually tested one day after milling and occasionally retested after from 2–5 days. The quantity measured was the time in seconds required to extrude a given volume of the rubber stock at constant temperature and under a constant pressure. In the particular tests herein described the temperature of the plastometer and test pellet was 82° C. The pressure on the plunger was usually 4.5 pounds per square inch but occasionally other pressures were used as for example 5.0, 5.25 and 5.5 pounds per square inch. For this reason the figures given in the table below are ratios based upon the control or base stock run at the same pressure as 100 and are therefore directly comparable. From the actual readings in seconds there was calculated the percentage plasticity over the untreated rubber. Thus a figure 70 means that the stock extruded in 70% of the time required to extrude the untreated stock.

*Table*

| Stock | No. of days after milling on which stocks were tested— | | | |
|---|---|---|---|---|
| | 1 | 2 | 3 | 5 |
| A | 65 | | | 61 |
| B | | | 66 | |
| C | 81 | | | 86 |
| D | 74 | | | 77 |
| E | | | 63 | |
| F | 90 | | | 76 |
| G | 73 | 71 | | |
| H | 85 | | | |
| J | 76 | | | |
| K | 85 | | | |
| L | 78 | | | 76 |
| M | 86 | | | 84 |

The above data show that the incorporation of a small proportion of one of the preferred class of materials into a rubber composition brings about a marked increase in the plasticity.

The preferred materials may be employed in different proportions than those specifically shown and in conjunction with other compounding and vulcanizing ingredients. Obviously the preferred materials may be employed to plasticize crude rubber before the addition of compounding and vulcanizing ingredients or may be added directly to rubber in the form of latex as for example by incorporating the softening agent into an organic solvent and emulsifying the latter with the latex. The present invention is limited solely by the claims attached hereto as part of the specification.

What is claimed is:

1. The method of increasing the plasticity of rubber which comprises subjecting the unvulcanized rubber to the action of a thio ester of a paraffin dicarboxylic acid belonging to the oxalic acid series.

2. The method of increasing the plasticity of rubber which comprises subjecting the unvulcanized rubber to the action of a compound containing the nucleus

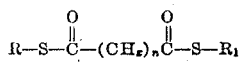

where R and R₁ are organic ester forming groups a carbon atom of which is linked to the sulfur atom, $x$ is an integer less than 3, $n$ is a number less than four.

3. The method of increasing the plasticity of rubber which comprises subjecting the unvulcanized rubber to the action of a thio ester of oxalic acid.

4. The method of increasing the plasticity of rubber which comprises subjecting the unvulcanized rubber to the action of a compound containing the nucleus

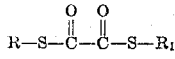

where R and R₁ are organic ester forming groups a carbon atom of which is linked to the sulfur atom.

5. The method of increasing the plasticity of rubber which comprises subjecting the unvulcanized rubber to the action of a compound containing the nucleus

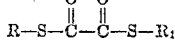

where R and R₁ are aryl groups.

6. The method of increasing the plasticity of rubber which comprises subjecting the unvulcanized rubber to the action of a compound containing the nucleus

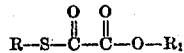

where R is an organic ester forming group a carbon atom of which is linked to the sulfur atom and R₁ is an alkyl group.

7. The method of increasing the plasticity of rubber which comprises subjecting the unvulcanized rubber to the action of diphenyl dithio oxalate.

8. The method of increasing the plasticity of rubber which comprises subjecting the unvulcanized rubber to the action of xylyl thio ethyl oxalate.

9. The method of increasing the plasticity of rubber which comprises subjecting the unvulcanized rubber to the action of diphenyl dithio fumarate.

10. Rubber obtained by subjecting unvulcanized rubber to the action of a thio ester of a paraffin dicarboxylic acid belonging to the oxalic acid series.

11. Rubber obtained by subjecting unvulcanized rubber to the action of a compound containing the nucleus

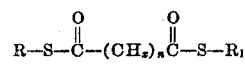

where R and R₁ are organic ester forming groups a carbon atom of which is linked to the sulfur atom, $x$ is an integer less than 3, $n$ is a number less than four.

12. Rubber obtained by subjecting unvulcanized rubber to the action of a thio ester of oxalic acid.

13. Rubber obtained by subjecting unvulcanized rubber to the action of a compound containing the nucleus

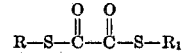

where R and R₁ are organic ester forming groups a carbon atom of which is linked to the sulfur atom.

14. Rubber obtained by subjecting unvulcanized rubber to the action of a compound containing the nucleus

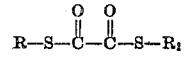

where R and R₁ are aryl groups.

15. Rubber obtained by subjecting unvulcanized rubber to the action of a compound containing the nucleus

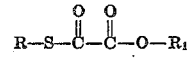

where R is an organic ester forming group a carbon atom of which is linked to the sulfur atom and R₁ is an alkyl group.

16. Rubber obtained by subjecting unvulcanized rubber to the action of diphenyl dithio oxalate.

17. Rubber obtained by subjecting unvulcanized rubber to the action of xylyl thio ethyl oxalate.

18. Rubber obtained by subjecting unvulcanized rubber to the action of diphenyl dithio fumarate.

19. The method of increasing the plasticity of rubber which comprises subjecting the unvulcanized rubber in the absence of free sulfur to the action of a compound containing the nucleus $$R-S-\underset{\underset{O}{\|}}{C}-\underset{\underset{O}{\|}}{C}-S-R_1$$

where R and $R_1$ are organic ester forming groups a carbon atom of which is linked to the sulfur atom.

20. The method of increasing the plasticity of rubber which comprises subjecting the unvulcanized rubber in the absence of free sulfur to the action of a compound containing the nucleus $$R-S-\underset{\underset{O}{\|}}{C}-\underset{\underset{O}{\|}}{C}-O-R_1$$

where R is an organic ester forming group a carbon atom of which is linked to the sulfur atom and $R_1$ is an alkyl group.

ROBERT L. SIBLEY.